Patented Aug. 2, 1949

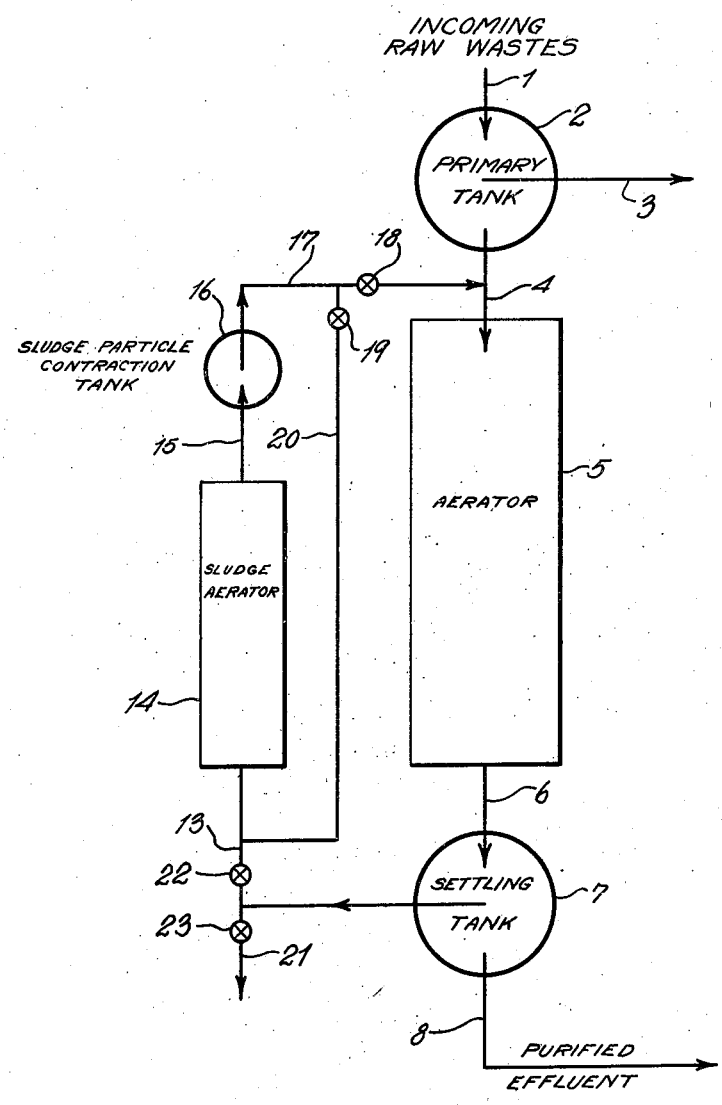

2,477,815

UNITED STATES PATENT OFFICE 2,477,815

PROCESS AND APPARATUS FOR PURIFYING WASTES

Edward B. Mallory, Tenafly, N. J.

Application July 18, 1945, Serial No. 605,717

3 Claims. (Cl. 210—8)

The invention relates to the purification of sewage and other wastes by the use of the so-called activated sludge process (which I believe is to be more properly described as the oxidized sludge process), according to which process the incoming wastes after appropriate primary treatment are passed into an aerator and then from the aerator into a clarifier or settling tank in which latter sludge is settled out in the lower zone of the tank and the supernatant purified effluent drawn off from the top, so-called return sludge as thus obtained in the clarifier being returned into admixture with the wastes under treatment in the aerator to form so-called mixed liquor which is aerated and passed into the settling tank as above described.

In order to increase the capacity of purification apparatus of the above character, particularly under circumstances where the colloidal component of the raw sewage is relatively high and a heavy mixed liquor concentration is required to afford complete clarification and purification, it has been previously proposed to add to the above cycle the step of aerating or oxidizing the return sludge on its way back into admixture with the wastes under treatment. However this additional step of reaerating the return sludge has not heretofore been found to be of substantial benefit in actual practice, and the belief has been current in the art that its value is not such as to warrant the extra equipment needed for its use. The present invention relates particularly to purification processes and apparatus of the above character wherein the above mentioned step of recirculating the return sludge is employed. Aeration of the return sludge as above described acts to promote the conversion or driving off of impurities which the sludge particles have previously absorbed, but I have found that this oxidizing step also causes the recirculated oxidized sludge particles to re-enter the main cycle in a condition which impairs the purifying action which they are relied upon to perform in the main aerating and settling tanks of the apparatus.

Thus the efficacy of the process is impaired for the above reason by the step of oxidizing or aerating the return sludge if employed. It has also been proposed to subject oxidized returning sludge to a settling step in settling tanks wherein the sludge particles were deposited in the form of a blanket occupying but a minor portion of the total volume of the tank contents, the supernatant liquor being drawn off, and the thus concentrated reoxidized and settled sludge returned into admixture with the contents of the aerator in the main aerator. However such a resettling step, although long since proposed, has not been found desirable for practical use.

I have found that the objections to the use of the above mentioned step of aerating return sludge may be largely overcome, and the efficiency of the process substantially augmented if the aerated returning sludge, before entering the mixed liquor in the main aerator, is subjected to what I term a sludge particle contracting step wherein, without settling out sludge to any large extent as in the prior proposal last above discussed, the size of the unit sludge particles is substantially reduced; this treatment substantially increases their capacity for absorbing and adsorbing the impurities of the mixed liquor in the main aerator. I have found that highly oxidized return sludge, if in condition to act most effectively in the aerator, will not settle to any large extent, and that therefore if oxidized return sludge be subjected to a settling step as in the prior proposal last above discussed wherein it was settled down into a blanket occupying only a small portion of the settling tank contents, the benefits of the sludge reaeration step will be largely lost, rendering the sludge reaerating and settling steps ineffective.

In accordance with the present invention return sludge after being thoroughly oxidized, passes into a sludge particle contraction tank where, for a period of about fifteen minutes to one hour, the contents of the tank are maintained under conditions sufficiently quiescent to cause the sludge particles to contract in size. The liquor may move through this tank at a slow rate since complete quiescence is not necessary, and settling of the sludge particles does not progress to a point where the sludge occupies less than about 90% of the volume of the tank contents. Thus there will be not more than about 10% supernatant liquor at the top of the tank, which it is unnecessary and generally undesirable to draw off, the entire contents of the sluge particle contraction tank being preferably returned to the aerator. The thinner the sludge entering this tank the shorter will be the detention period required to enable the sludge particles to contract as above described. In instances where the detention period of the sludge in this tank has been about two hours or longer, sludge from this tank is preferably returned to the sludge aerator for reaeration, and then resubjected to the contracting step for a short period as above described, to properly recondition it before passing back into admixture with the contents of the main aerator.

Further features and advantages of the invention will be in part obvious and in part specifically referred to in the description hereinafter contained which, taken in conjunction with the accompanying drawings, discloses the invention as carried out by the aid of a preferred form of apparatus. The disclosure, however, should be considered as only illustrative of the principles of the invention in its broader aspects. In the drawings—

The single figure is a schematic diagram showing in simplified form one type of apparatus capable of being operated in accordance with the invention.

In the figure the invention is shown as carried out by a purification apparatus wherein the raw waste to be treated, coming in at 1, first enters a primary treatment tank 2 which may be of known character, and from which primary sludge may be conducted for disposal as indicated at 3. The wastes remaining for treatment then pass as indicated at 4 into an aerator 5, various forms of which are also known to the art. From the aerator 5 the wastes under treatment pass as indicated at 6 into a so-called clarifier or settling tank 7 which may also be of known construction, the purified effluent passing off as indicated at 8. Sludge settled out in the bottom of the settling tank 7 is passed through a conduit 13 to a sludge aerator 14 of any appropriate construction, and after being thoroughly oxidized in the aerator 14, the oxidized sludge passes thru conduit 15 to a sludge particle contraction tank 16 wherein the size of the sludge particles is reduced by detaining the sludge in the tank 16 under relatively quiescent conditions for a period of about fifteen minutes to one hour as above described, the detention period being so short that the sludge does not settle down to occupy less than about 90% of the total volume of the tank contents. After this sludge particle contraction step has been completed, the conditioned sludge passes through a conduit 17 into admixture with the wastes which are to be treated in the main aerator 5. In instances where the sludge has remained too long in tank 16, so that it settles out into a blanket occupying a smaller portion of the tank and is therefore in inferior condition to act effectively in aerator 5, all or a portion of the contents of the tank 16 by proper adjustment of the valves 18 and 19 may be recirculated back through pipe 20 to pass again through aerator 14 and tank 16 for proper reconditioning. It will be understood that the sludge reconditioning steps above referred to may be applied in whole or in part to the sludge drawn off from settling tank 7, a certain amount of the sludge being usually drawn off either continuously or from time to time through an offtake pipe 21, by proper adjustment of the valves 22 and 23.

Preferably the operation of the main process is controlled in accordance with Patent No. 2,154,132 issued to me on April 11, 1939 entitled "Process of controlling the purification of sewage" in order that the return sludge entering the conduit 13 may be of proper character. This application is continuation in part of my prior copending application Serial Number 506,821, now abandoned, entitled "Waste purification process and apparatus."

While the invention has been disclosed as carried out by the above described particular form of apparatus it should be understood that changes may be made therein without departing from the invention in its broader aspects, within the scope of the appended claims.

I claim:

1. A waste purification process of the character described which includes passing wastes to be purified successively through an aerator and clarifier, settling sludge in said clarifier, withdrawing settled sludge from said clarifier, aerating same, and returning thus aerated sludge back into admixture with wastes under treatment in said aerator, said process also including the step of contracting the size of the thus returning aerated sludge particles, before admixing the same with wastes as above mentioned, by detaining said returning sludge in a tank under relatively quiescent conditions, for a period of the order of fifteen minutes to one hour, to produce settling of the sludge in said tank to occupy not less than about 90% of the volume of the tank contents.

2. A waste purification apparatus of the character described including a mixed liquor aerator, a clarifier, means for conducting wastes to be treated to said aerator and for conducting aerated mixed liquor from said aerator to said clarifier, means for recirculating sludge from said clarifier back into admixture with wastes under treatment in said aerator, means for aerating such recirculating sludge, said apparatus also including tank means for detaining thus aerated recirculating sludge under relatively quiescent conditions for a period of the order of fifteen minutes to one hour, to produce settling of the sludge in said tank means to occupy not less than about 90% of the volume of the contents thereof, prior to admixture of said sludge with said wastes as above mentioned.

3. A waste purification apparatus of the character described including a mixed liquor aerator, a clarifier, means for conducting wastes to be treated to said aerator and for conducting aerated mixed liquor from said aerator to said clarifier, means for recirculating sludge from said clarifier back into admixture with wastes under treatment in said aerator, means for aerating such recirculating sludge, said apparatus also including tank means for detaining thus aerated recirculating sludge under relatively quiescent conditions for a period of the order of fifteen minutes to one hour, to produce settling of the sludge in said tank means to occupy not less than about 90% of the volume of the contents thereof, prior to admixture of said sludge with said wastes as above mentioned, said apparatus including means adjustable to recirculate sludge delivered from said tank means back into said sludge aerating means.

EDWARD B. MALLORY.

REFERENCES CITED

The following references are of record in the file of this patent:

UNITED STATES PATENTS

| Number | Name | Date |
|---|---|---|
| 1,820,977 | Imhoff | Sept. 1, 1931 |
| 1,904,916 | Coombs | Apr. 18, 1933 |
| 2,089,162 | Goudey et al. | Aug. 3, 1937 |
| 2,118,266 | Nordell | May 24, 1938 |
| 2,254,953 | Thomas | Sept. 2, 1941 |
| 2,270,869 | Ditto et al. | Jan. 27, 1942 |
| 2,337,507 | Thayer | Dec. 21, 1943 |
| 2,349,390 | Tolman | May 23, 1944 |
| 2,363,176 | Gunz | Nov. 21, 1944 |
| 2,378,756 | Durdin, 3d | June 19, 1945 |
| 2,388,795 | Montgomery et al. | Nov. 13, 1945 |

FOREIGN PATENTS

| Number | Country | Date |
|---|---|---|
| 218,399 | Great Britain | June 27, 1924 |